A. Anderson,
Table Leaf Support.
No. 100,965. Patented Mar. 22. 1870.
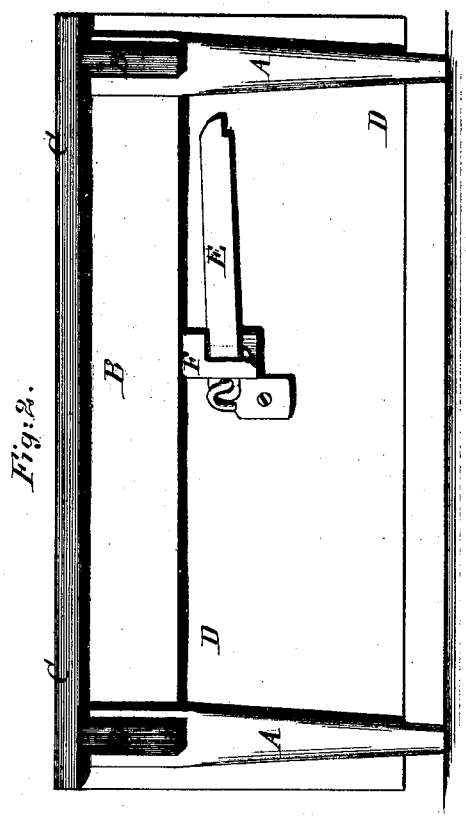
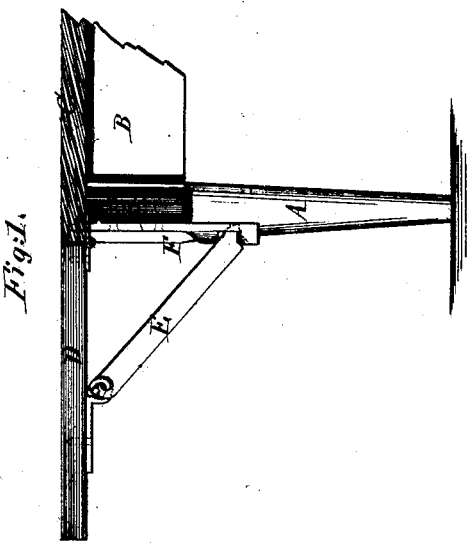
Witnesses:
M. Vorlander
Mott Brooks
Inventor:
A. Anderson
per Mmuff
Attorneys.

United States Patent Office.

ARON ANDERSON, OF SOUTH BEND, INDIANA.

Letters Patent No. 100,965, dated March 22, 1870.

IMPROVED TABLE-LEAF SUPPORT.

The Schedule referred to in these Letters Patent and making part of the same.

*To all whom it may concern:*

Be it known that I, ARON ANDERSON, of South Bend, in the county of St. Josephs and State of Indiana, have invented a new and useful Improvement in Table-Leaf Support; and I do hereby declare that the following is a full, clear, and exact description thereof, which will enable others skilled in the art to make and use the same, reference being had to the accompanying drawings forming part of this specification.

Figure 1 is a detail cross-section of a part of a table to which my table-leaf support has been attached.

Figure 2 is a longitudinal section of the same.

Similar letters of reference indicate corresponding parts.

My invention has for its object to furnish an improved table-leaf support which shall be simple, in construction, effective in operation, and conveniently operated, and which may be attached to any style of table having a falling leaf or leaves; and It consists in the pivoted brace-bar and slotted support, constructed and operating as hereinafter more fully described.

A are the legs;

B is the frame;

C is the top; and

D is the leaf which is hinged to the top C in the ordinary manner.

E is the brace-bar, the outer or upper end of which is pivoted to the under side of the leaf D in such a way as to have a free vertical and lateral movement.

The other or lower end of the bar E is notched, as shown in figs. 1 and 2, to catch upon the upright or support F, through a slot in the lower end of which the said brace-bar E passes.

The upper end of the support F is securely attached to the side bar of the frame B, and its lower end is slotted for the passage of the brace-bar E.

The support F is attached to the frame a little out of line with the pivoting point of the brace-bar E, as shown in fig. 2, and its lower end is recessed upon its opposite sides, as shown in figs. 1 and 2, so that when the leaf D is lowered the bar E may take a position parallel with the leaf D, as shown in fig. 2.

By this construction when the leaf D is raised into a horizontal position, as shown in fig. 1, the brace-bar E, from its own weight, will catch upon the support F, and firmly and securely support the leaf.

To lower the leaf, it should be slightly raised, and the brace-bar E should be raised a little by the hand or foot, and the leaf lowered at the same time, the brace-bar E, as it slides through the slot in the support F, swinging around into a position parallel with the leaf D. This support may be attached to center-legged tables, and will not interfere with drawers placed in the frame of the table, or with the slides of extension tables, being thus applicable to all the various styles of tables.

Having thus described my invention,

I claim as new and desire to secure by Letters Patent—

An improved table-leaf support formed by the combination of the pivoted brace-bar E, and the slotted and recessed support F, said brace-bar and support being constructed, arranged, and operating in connection with the leaf and frame of a table as herein shown and described, and for the purpose set forth.

ARON ANDERSON.

Witnesses:
A. S. DUNBAR,
JOHN RUSH.